(12) United States Patent
Park et al.

(10) Patent No.: US 9,703,176 B2
(45) Date of Patent: Jul. 11, 2017

(54) CAMERA MODULE FOR PROVIDING OPERATIONAL CONVENIENCE

(71) Applicant: LG INNOTEK CO., LTD., Seoul (KR)

(72) Inventors: Ji Hwan Park, Seoul (KR); Sang Yeal Han, Seoul (KR); Min Woo Lee, Seoul (KR); Jin Ho Lee, Seoul (KR); Seung Man Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 79 days.

(21) Appl. No.: 14/600,069

(22) Filed: Jan. 20, 2015

(65) Prior Publication Data
US 2015/0205186 A1    Jul. 23, 2015

(30) Foreign Application Priority Data

Jan. 20, 2014  (KR) .................. 10-2014-0006665
Jan. 29, 2014  (KR) .................. 10-2014-0011563

(51) Int. Cl.
*G03B 17/08* (2006.01)
*B60R 11/04* (2006.01)
*H04N 5/225* (2006.01)
*G02B 7/02* (2006.01)
*B60R 11/00* (2006.01)
*G02B 27/00* (2006.01)

(52) U.S. Cl.
CPC .............. *G03B 17/08* (2013.01); *B60R 11/04* (2013.01); *G02B 7/021* (2013.01); *G02B 7/026* (2013.01); *H04N 5/2253* (2013.01); *H04N 5/2254* (2013.01); *B60R 2011/004* (2013.01); *B60R 2011/0094* (2013.01); *G02B 27/0006* (2013.01)

(58) Field of Classification Search
CPC .............. B60R 11/14; B60R 2011/004; B60R 2011/0094; G02B 27/0006; G02B 7/021; G02B 7/026; G03B 17/08; H04N 5/2253
See application file for complete search history.

(56) References Cited

U.S. PATENT DOCUMENTS 7,505,558 B2 * 3/2009 Nanni ................ A61B 6/14
                                         250/370.09
8,542,451 B2 * 9/2013 Lu .................... G02B 7/025
                                         359/819
9,106,819 B1 * 8/2015 Gao ................... H04N 5/2254
(Continued)

*Primary Examiner* — Amy Hsu
(74) *Attorney, Agent, or Firm* — KED & Associates, LLP

(57) ABSTRACT

A camera module includes a lens holder, a base coupled to the lens holder and integrally formed with a cable by being molded with the cable, and a sealing member positioned at a coupled surface between the lens holder and the base. The lens holder includes a lens barrel including a first concave unit formed at a front surface with a hollow hole part to accommodate a first O-ring, and a second concave unit formed at a periphery to accommodate a second O-ring. A lens unit includes a front lens arranged at a front surface of a lens barrel and includes at least one lens arranged at the hollow hole part of the lens barrel, and a retainer including a recess groove configured to accommodate a third O-ring configured to fix the front lens by being formed at a periphery to be coupled at an inner surface to the periphery of the lens barrel.

16 Claims, 10 Drawing Sheets

(56) References Cited

U.S. PATENT DOCUMENTS

| | | | | |
|---|---|---|---|---|
| 2001/0055368 | A1* | 12/2001 | Carroll | A61B 6/14 |
| | | | | 378/189 |
| 2006/0092506 | A1* | 5/2006 | Tsuchiya | G02B 7/008 |
| | | | | 359/395 |
| 2009/0277963 | A1* | 11/2009 | Van Kerkhoven | G03B 13/18 |
| | | | | 235/462.21 |
| 2014/0160284 | A1* | 6/2014 | Achenbach | H04N 5/2251 |
| | | | | 348/143 |
| 2014/0168507 | A1* | 6/2014 | Renaud | H04N 5/2257 |
| | | | | 348/373 |
| 2015/0015713 | A1* | 1/2015 | Wang | H04N 5/235 |
| | | | | 348/148 |

* cited by examiner (a)            (b)

CAMERA MODULE FOR PROVIDING OPERATIONAL CONVENIENCE

CROSS-REFERENCE TO RELATED PATENT APPLICATIONS

This application claims priority under 35 U.S.C. §119 to Korean Application Nos. 10-2014-0006665, filed on Jan. 20, 2014, and 10-2014-0011563, filed on Jan. 29, 2014, whose entire disclosures are incorporated herein by reference.

BACKGROUND

1. Field

The present disclosure relates to a camera module.

2. Background

In general, recently-manufactured vehicles are mounted with a camera to monitor a rear side of the vehicle through a screen. Unlike the background electronic devices, the vehicular camera is exposed to outside of the vehicle, such that it is important to prevent the camera from being degraded in performance due to changes in external environment. For example, a structural design is essential to prevent product degradation from penetration of moisture such as rain or snow and climate changes.

However, the vehicular camera is coupled with several parts existent with gaps through which various foreign objects and moisture can be introduced. Thus, it is necessary to design a vehicular camera in a manner such that moisture and foreign objects can be prevented from penetrating into the camera.

Meantime, when a camera module including a lens module is assembled with a PCB (Printed Circuit Board) mounted with an image sensor and a lens holder mounted with a lens module, the assemblage is usually implemented by screw connection. The use of screw connection is disadvantageous in that a processing time may increase and twist (or bent out of shape) of optical axis may be generated by a coupling force (rotating moment) of a screwing bolt. Particularly, it is difficult to correct the rotation and tilt of the lens module with respect to the image sensor, once the coupling between the lens module and the PCB is finished, thereby disabling to expect an enhancement in image quality.

BRIEF DESCRIPTION OF THE DRAWINGS

The embodiments will be described in detail with reference to the following drawings in which like reference numerals refer to like elements wherein.

DETAILED DESCRIPTION

Figure 1:
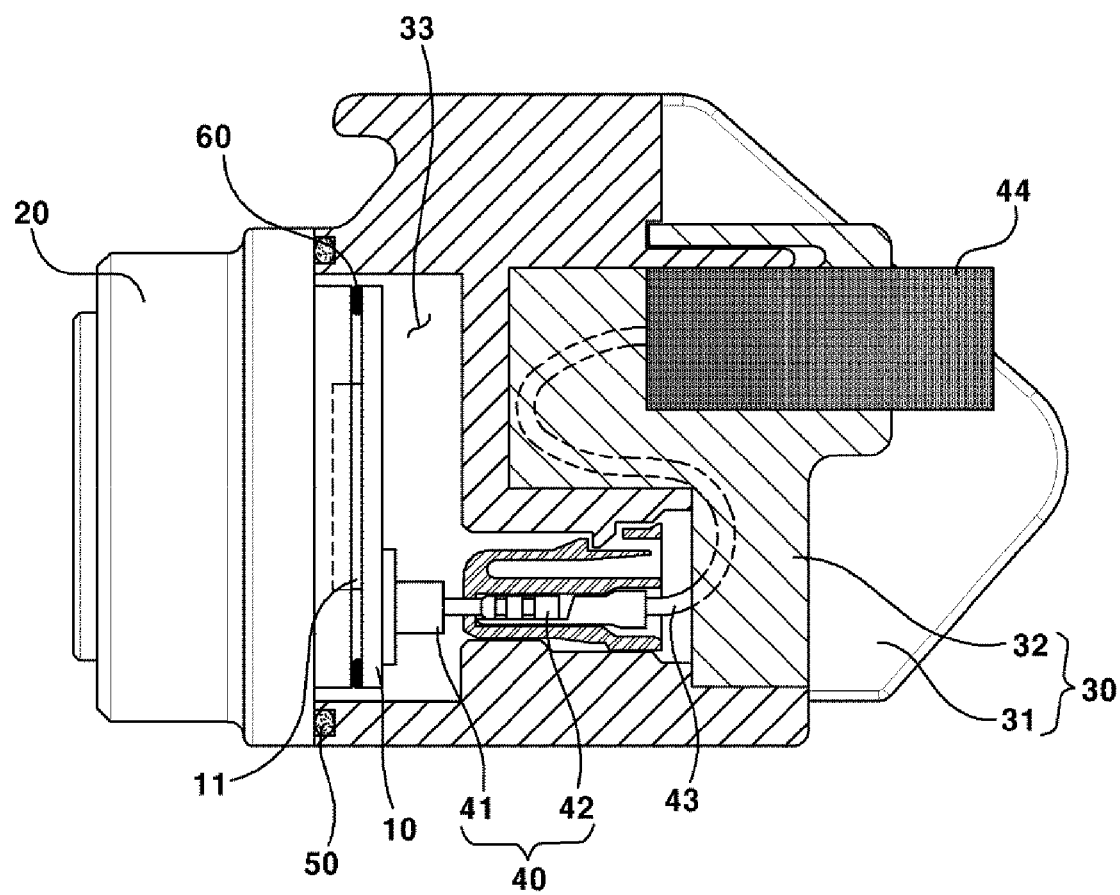
FIG. 1 is a schematic cross-sectional view illustrating a camera module according to a first exemplary embodiment of the present disclosure.
Figure 2:
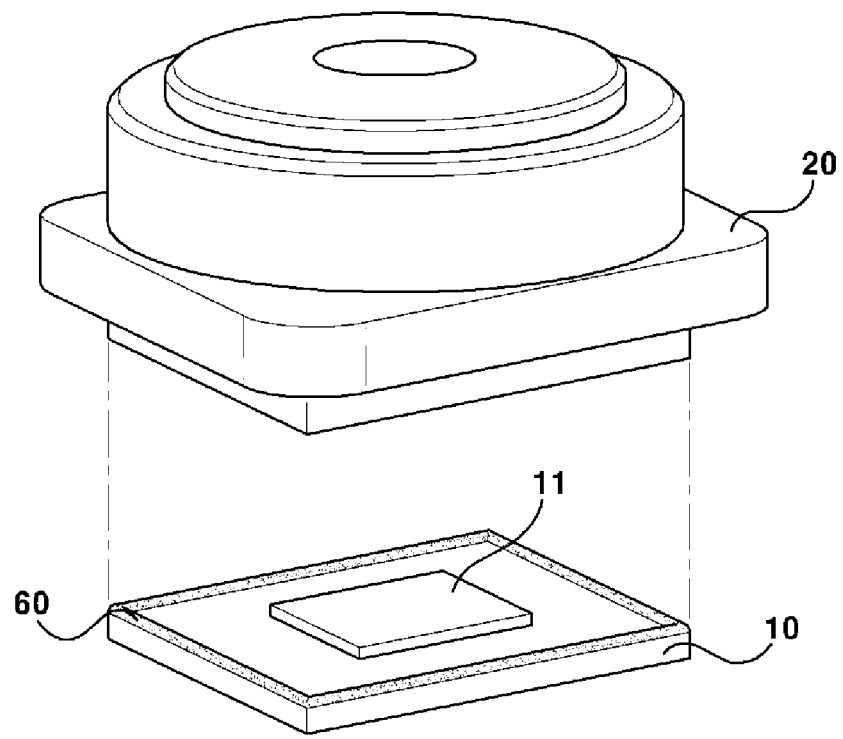
FIG. 2 is an exploded perspective view illustrating a connected structure between a holder member and a PCB of FIG. 1.

Referring to FIGS. 1 and 2, a camera module according to an exemplary embodiment of the present disclosure may include a PCB (10), a lens holder (20) and a base (30). The PCB (10) is mounted with an image sensor (11) and coupled to the lens holder (20). The lens holder (20) may be installed therein with a lens module (not shown). The lens module may constitute an optical system by being formed with one lens or with a plurality of mutually different lenses.

The lens holder (20) and the lens module may be integrally formed, or the lens module may be coupled and/or fixed to the lens holder (20). The lens holder (20) and the PCB (10) may be fixed by an adhesive member (60). In the exemplary embodiment, the adhesive member (60) is an adhesive agent curable under a particular condition, and may be provided with an epoxy curable by heat or UV (Ultraviolet). The present disclosure is not limited thereto and the adhesive member (60) may be formed with any one of heat-curable epoxy or an UV epoxy.

The reason of using the adhesive agent curable under a particular condition is to fix the lens holder (20) and the PCB (10) after optical axis alignment. That is, as illustrated in FIG. 2, the adhesive member (60) is coated across the board at a predetermined width and thickness on a surface contacted by the PCB (10) and the lens holder (20). After the adhesion member (60) is coated, the lens holder (20) can be moved relative to the PCB (10) due to the thickness of the adhesion member (60) when the lens holder (20) is tightly contacted to an upper side of the adhesion member (60), or at a position where the adhesion member (60) is spaced apart from the lens holder (20) at a predetermined distance. The lens holder (20) can be moved to a six-axis direction for x, y and z axes relative to shifting and tilting directions, whereby an optical axis alignment can be accurately performed. Furthermore, the PCB (10) may be moved to perform an optical axis alignment.

Figure 3:
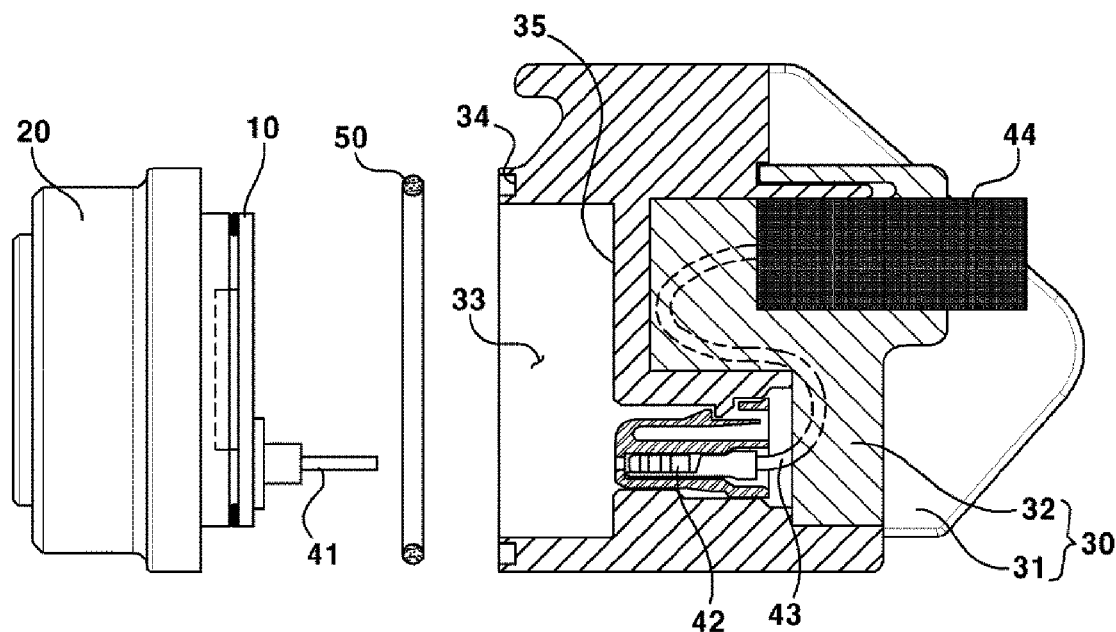
FIG. 3 is an exploded view illustrating a connected structure between a holder member and a base.

Referring to FIG. 3, the lens holder (20) assembled with the PCB (10) may be coupled to the base (30) using the sealing member (50). At this time, the base (30) may be integrally molded with a cable (44). The base (30) may include first and second molding units (31, 32) according to an exemplary embodiment of the present disclosure.

The first molding unit (31), which is a body part coupled to the lens holder (20), is formed with a concave unit (33) at a surface opposite to that of the lens holder (20). A width and thickness of the concave unit (33) may be wider and deeper than those of the PCB (10). An outer area of the concave unit (33) may be formed with a sealing groove (34) to be coupled by the sealing member (50). The shape of the sealing member (50) may be changed in response to a cross-sectional shape of the sealing member (60).

Figure 4:
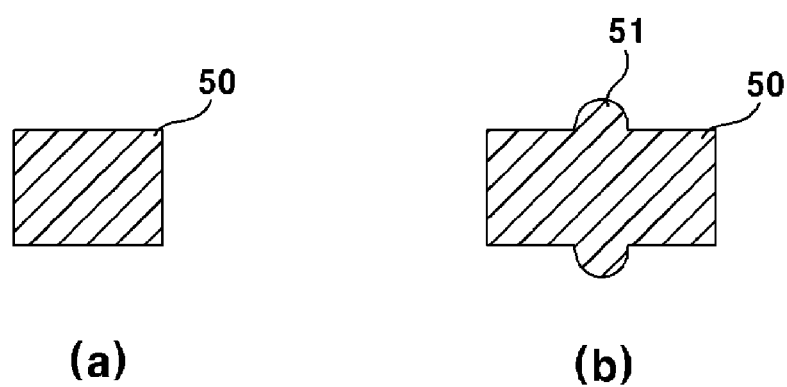
FIG. 4 is a cross-sectional view illustrating a sealing member of FIG. 3.

The sealing member (50) may be provided with an O-ring formed with silicon or rubber. The sealing member (50) may have various cross-sectional shapes. For example, as illustrated in FIG. 3, the sealing member (50) may have a round cross-sectional shape. However, the present disclosure is not limited thereto, and the sealing member (50) may have a square cross-sectional shape, or a semi-circular protruder (51) shape protruded from at least two surfaces of a square shape, as illustrated in FIGS. 4(a) and (b).

The second molding unit (32) is arranged at an inner side of the first molding unit (31) and may be arranged thereinside with at least one wire (43) connected to the cable (44). At this time, the wire (43) may be extracted from the cable (44) and a distal end of the wire (43) may be removed of coating to expose a metal line. Meantime, the first and second molding units (31, 32) may be formed with different materials or with same material. The material of the first and second molding units (31, 32) may be any material as long as it has an insulating physical property. The conductive unit (40) may include first and second terminals (41, 42). The first terminal (41) may be installed at the PCB (10) side and the second terminal (42) may be installed at a base (30) side according to the exemplary embodiment of the present disclosure.

Referring to FIGS. 1 and 3, the first terminal (41) may be installed at a surface opposite to the base (30) of the PCB (10), and may be formed with a pin header. The second terminal (42) may be coupled to the first terminal (41) in a complementary manner, and may be formed in a terminal block when the first terminal (41) is a pin header. However, the present disclosure is not limited thereto, and the second terminal (42) may be coupled to the first terminal (41) in any complementary manner, e.g., male and female configuration.

Referring to FIGS. 1 and 3 again, the second terminal (42) may be fixed to an inner space of the first molding unit (31). A surface (35) opposite to the PCB (10) of the concave unit (33) at the first molding unit (31) may be formed with a groove unit with a size corresponding to that of the second terminal (42) to expose the wire (43). A metal line of the exposed wire (43) may be conductively connected to the second terminal (42). Furthermore, the second terminal (42) may be so installed at a distal end as not to oversize the surface (35) of the groove unit (33), whereby a coupling space between the first and second terminals (41, 42) can be minimized and a length of the base (30) can be maximally reduced.

The conductive unit (40) according to the exemplary embodiment of the present disclosure may be arranged at an inner space of the base (30). That is, the PCB (10) is arranged at an inner space of the groove unit (33) formed at the base (30) to allow conductively connecting the first and second terminals (41, 42).

Furthermore, the second terminal (42) may be arranged at a position lower than that of the cable (44), which is to reduce a length of the base (30) as maximum as possible by bending the wire (43) connecting a distal end of the cable (44) to the second terminal (42) in the shape of 'S'. However, the present disclosure is not limited thereto, and the cable (44) may be arranged downwards and the second terminal (42) may be arranged upwards.

The lens holder (20) and the base (30) may be directly coupled through a complementary coupling structure, or may be screw-connected. That is, a surface opposite to the PCB (10) or the base of the lens holder (20) may be provided with a complementary coupling structure like a hook or a staircase, by which the lens holder (20) and the base (30) may be directly coupled. Alternatively, the PCB (10) or the lens holder (20) may be formed with a screw coupling hole and a screw coupling hole is formed at a position opposite to the base (30), where a fastening bolt is inserted to the base (30) for direct coupling. At this time, a sealing member (50) may be required for sealing of a connection part between the lens holder (20) and the base (30).

Figure 5:
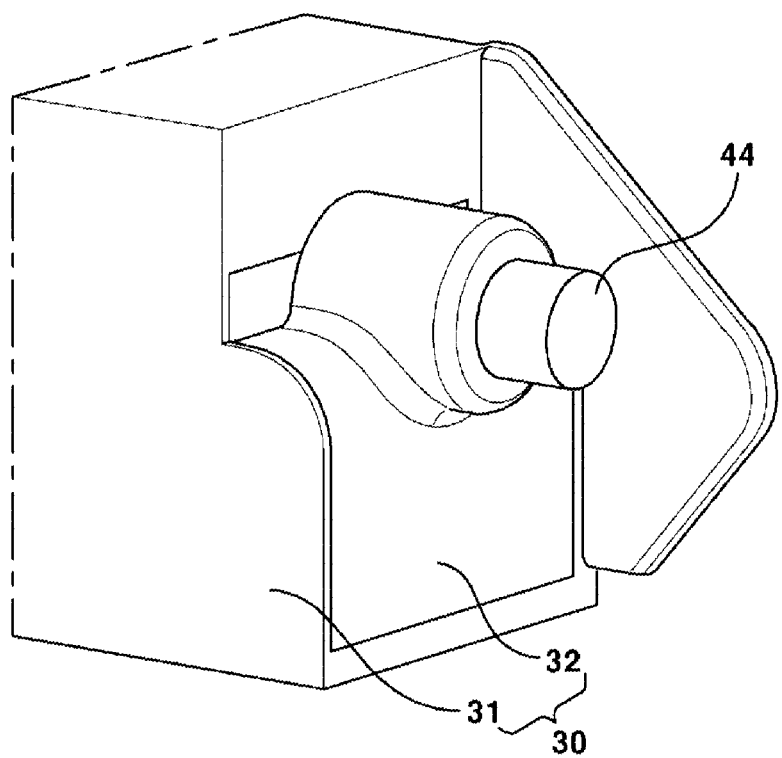
FIG. 5 is a rear perspective view illustrating a base.

Referring to FIG. 5, the base (30) is formed with the first and second molding units (31, 32), whereby the wire (43) and the cable (44) are prevented from being penetrated by moisture or foreign objects free from a separate sealing member according to the exemplary embodiment of the present disclosure, and at this time, the sealing member (50) thus described may be added.

Furthermore, no separate process such as soldering process is required to conductively connect the lens holder (20) mounted with the PCB (10) to the base (30), whereby the assemblage can be enhanced. The complementary coupling of the first and second terminals (41, 42) alone can conductively connect the lens holder (20) to the base (20). Because the adhesive member (60) curable by heat or UV is used for attach/fix the PCB (10) to the lens holder (20), an optical axis alignment for the lens holder (20) and the PCB (10) can be more accurately implemented. Because the adhesive member (60) is cured by heat or UV after the optical axis alignment is performed, the fixation of the optical axis alignment and the assembly of the PCB (10) to the lens holder (20) can be simultaneously implemented.

Figure 6:
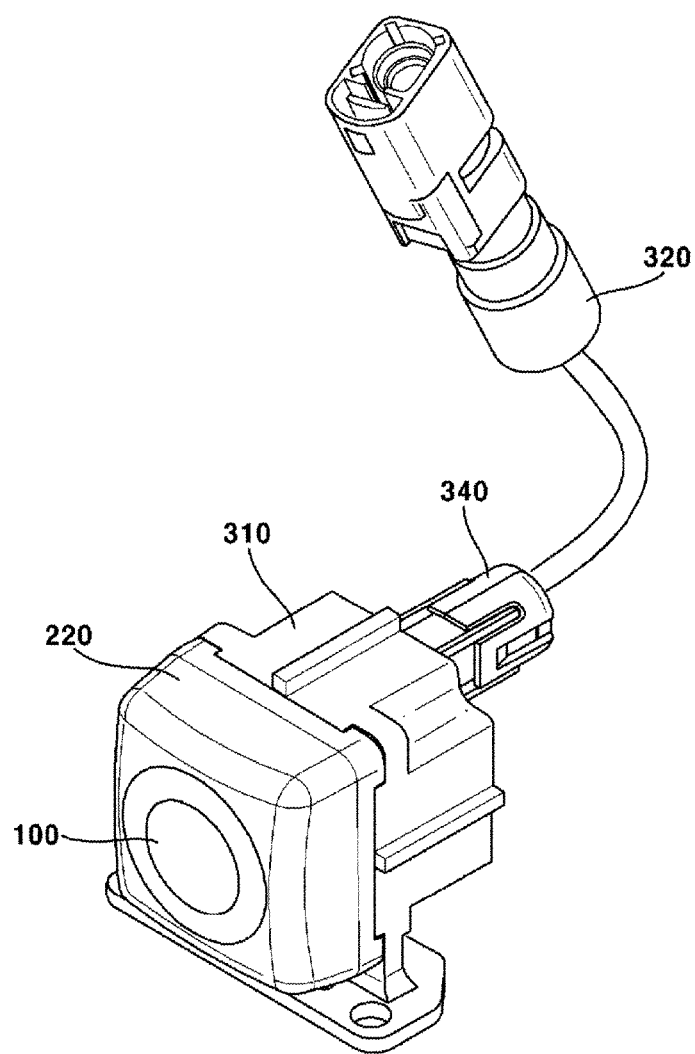
FIG. 6 is a perspective view illustrating a camera module according to a second exemplary embodiment of the present disclosure.
Figure 7:
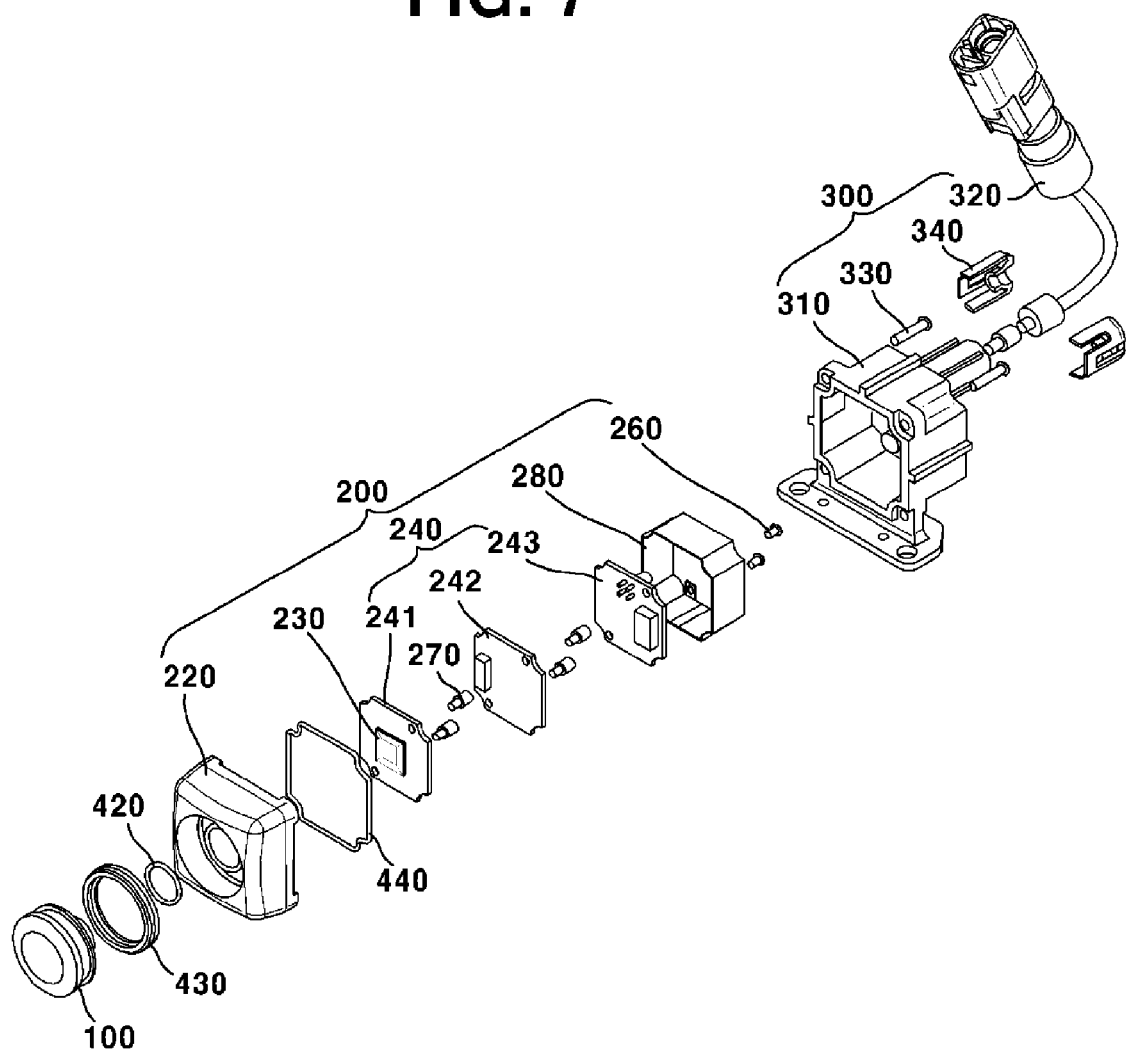
FIG. 7 is an exploded perspective view illustrating a camera module according to a second exemplary embodiment of the present disclosure.

Referring FIGS. 6 and 7, the camera module according to the second exemplary embodiment of the present disclosure may include a lens unit (100), and may largely include a lens barrel (110), a lens unit (120) and a retainer (130). See FIG. 8. Furthermore, the camera module according to the second exemplary embodiment of the present disclosure may further include, as a front unit (200), a front cover (220) as a front unit (200), a first screw (260), a second screw (270), an image sensor (230), a substrate (240) and/or an EMI shield can (280), and may further include, as a rear unit (300), a rear cover (310), a cable unit (320), a third screw (330) and/or a cable holder (340).

The front cover (220 may accommodate the substrate (240) and a gasket (440), and may be formed with an opening to expose a front lens (121, described later). The front lens (121) can be exposed through the opening (described later). The lens barrel (110) may accommodate the lens unit (120) to be coupled to the retainer (130) (see FIG. 8 for further details), and the retainer (130) may be coupled to the front cover (220). The front cover (220) may be arranged thereunder with an image sensor (230) configured to convert an optical signal of an object incident through the lens unit (120) to an electric signal, and the image sensor (230) may be mounted on the substrate (240).

The substrate (240) may include a sensor PCB (241) mounted with the image sensor (230), an ISP (Image Signal Processing) PCB (242) configured to process an image incident to the image sensor, and/or a power source PCB (243) configured to apply an electric power. Furthermore, the front cover (220) may be further arranged with a filter. The image sensor (230), which is an image pickup device, may be formed with a filter configured to block a near infrared wavelength and an UV wavelength, because the image sensor (230), unlike the human eyes, can detect the near infrared wavelength and the UV wavelength and has a tendency of reddened screen tone during imaging process.

The filter may be installed at a rear side of a through hole centrally formed at the front cover (220), and may be fitted with an infrared ray filter. Furthermore, the filter may be formed with a film material or a glass material, for example, and may be also arranged with a flat optical filter such as an image surface protective cover glass or a cover glass coated with an UV blocking coating material. Alternatively, the filter may not be arranged depending on design specification.

In order to protect the substrate (240) and other various elements, the substrate (240) may be coupled with an EMI shield can (280). Furthermore, a gasket (440) may be arranged at a coupled surface between the front cover (220) and the rear cover (310, described later) to prevent the moisture or foreign objects from penetrating the elements. Meantime, the gasket (440) may be called as a fourth O-ring.

The rear cover (310) may be formed at one side with a through hole by being coupled to the front cover (220), and the cable unit (320) may be coupled to the through hole of the rear cover (310) to be electrically connected to the substrate (240). At this time, a fifth O-ring or a cable holder (340) may be interposed between the cable unit (320) and the through hole to prevent the moisture or the foreign objects from penetrating.

The camera module thus described may be coupled by a first screw (260) and/or by a second screw (330), and other coupling methods using adhesive and/or molding may be also applied. Furthermore, the camera module according to the second exemplary embodiment of the present disclosure may be mounted on a vehicular camera, and the vehicular camera may be a back view camera configured to monitor a rear side of a vehicle, where the camera module according to the second exemplary embodiment of the present disclosure may be installed on a vehicle to allow the front cover (220) to be partially or entirely exposed outside of the vehicle.

Figure 8:
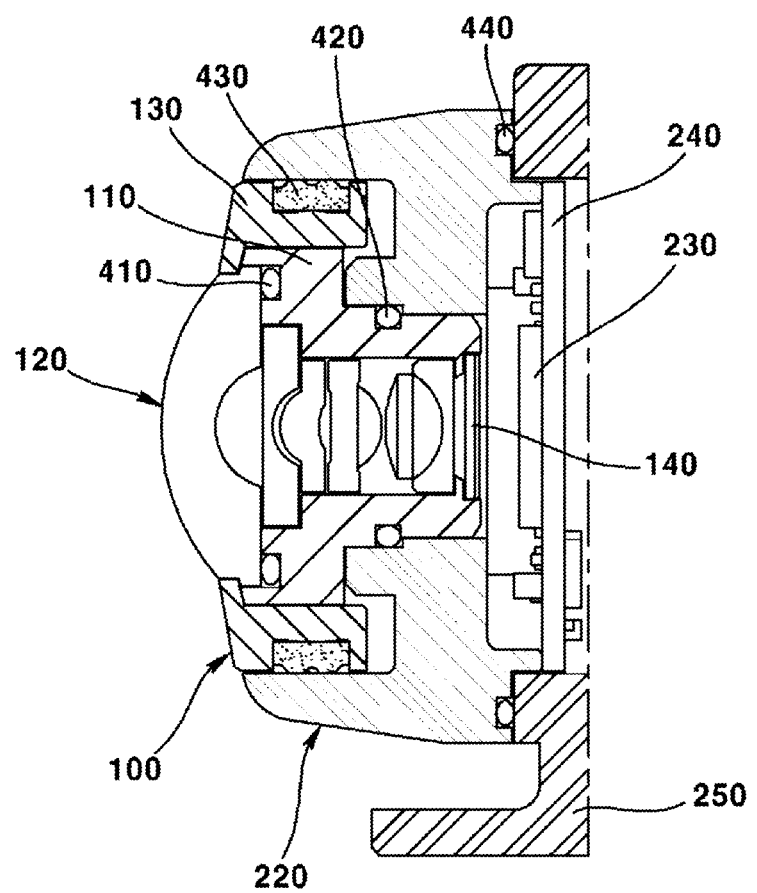
FIG. 8 is a schematic view illustrating a coupled state of a lens unit according to a second exemplary embodiment of the present disclosure.
Figure 9:
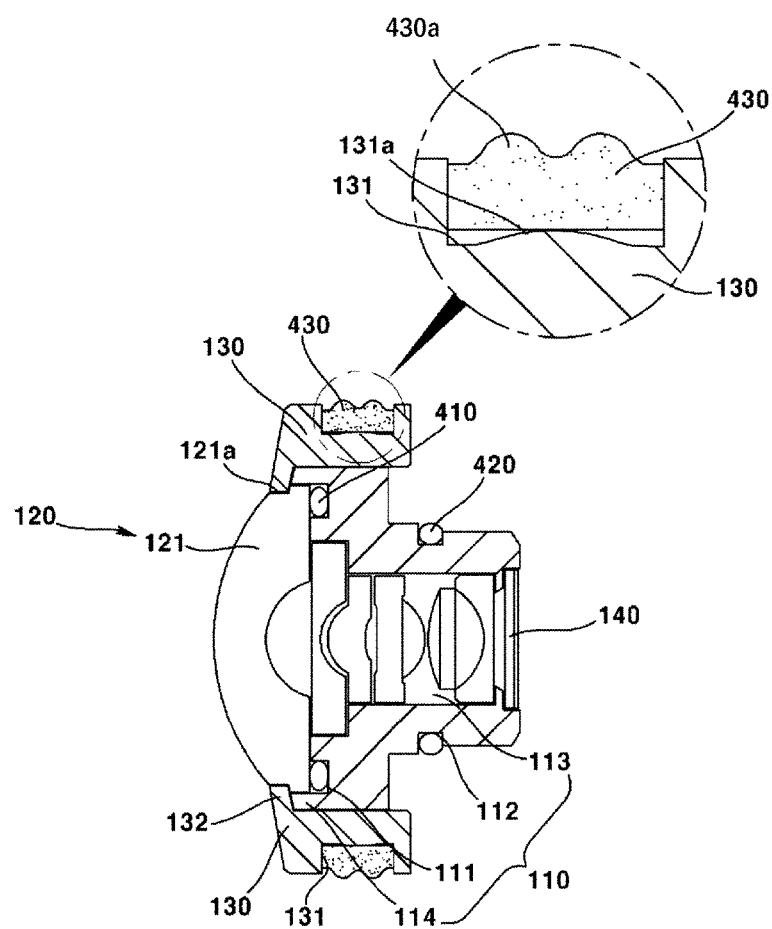
FIG. 9 is a lateral cross-sectional view illustrating a lens unit according to a second exemplary embodiment of the present disclosure.
Figure 10:
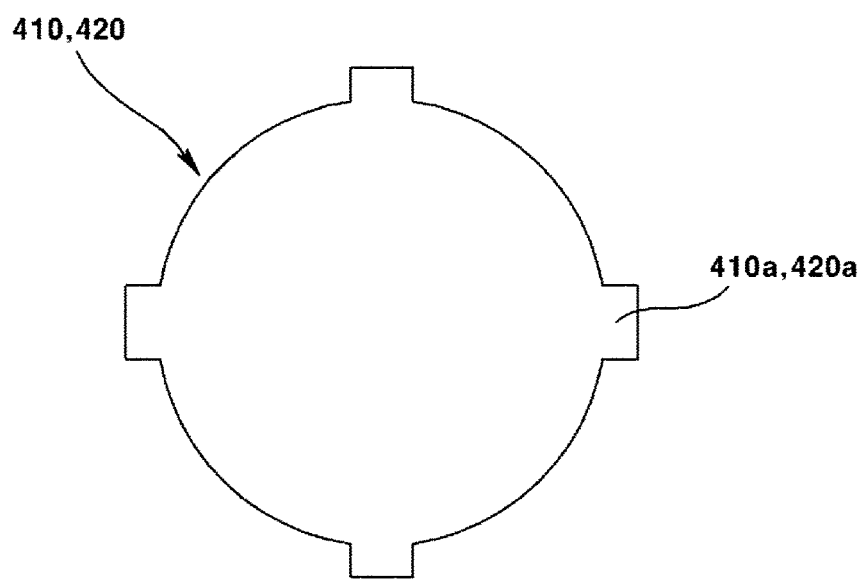
FIG. 10 is a lateral cross-sectional view illustrating an O-ring according to a second exemplary embodiment of the present disclosure.

The camera module according to the second exemplary embodiment of the present disclosure includes a structure configured to prevent penetration of moisture or foreign objects into the elements when the vehicle is in an external environment, the detailed explanation of which may be provided as under:

Referring to FIGS. 8 to 10, the camera module according to the second exemplary embodiment of the present disclosure may include a front lens (121), a lens barrel (110), a retainer (130) and first and second O-rings (410, 420). The lens barrel (110) may be formed with a hollow hole unit (113), and may include a first concave unit (111) accommodated with the first O-ring (410) as formed at a front side, and/or a second concave unit (112) accommodated by the second O-ring (420) as formed at a periphery, where the front side defines a direction where an image of an object enters the lens unit (120), the definition of which will be used in the same direction across the specification.

The lens barrel (110) may include a first concave unit (111) disposable with the first O-ring (410) between the front side and a front lens (121, described later), and a second concave unit (112) disposable with the second O-ring (420) between the lens barrel (110) and the front cover (220) when coupled to the front cover (220), whereby the penetration of moisture or foreign objects in the lens barrel (110) can be excellently prevented.

A periphery of the lens barrel (110) and an inner lateral surface of the retainer (130) may be formed with mutually opposite screw threads to allow screw connection, and may be coupled in a screw-less connection by coating adhesive agent thereon. Furthermore, the adhesive agent may be coated even during the screw connection to enhance a further secured coupling. The screw threads formed on the lens barrel (110) may be formed on an upper peripheral surface of the second concave unit (112) to initially prevent penetration of moisture and foreign objects, and the second O-ring (420) may serve to secondly prevent the penetration of moisture and foreign objects.

Furthermore, the lens barrel (110) may be coupled downunder to the front cover (220), where the lens barrel (110) may be also coupled downunder to the front cover (220) using the screw threads. When screw threads are formed at a bottom peripheral surface of the lens barrel (110), an inner corresponding lateral surface of the front cover may be also formed with corresponding screw threads to allow a mutual screw thread connection. Furthermore, the coupling may be implemented using adhesive material such as epoxy, and the adhesive material may be additionally coated after screw connection to allow bonding coupling.

Referring to FIG. 10, the first O-ring (410) and/or the second O-ring (420) according to the exemplary embodiment of the present disclosure are formed at each periphery with at least one recess protrusion (410a, 420a) each formed at an equidistance to be stably positioned at the first and second concave units (111, 112), and when an even number (e.g., two) of recess protrusions is formed, the first O-ring (410) and/or the second O-ring (420) can be more stably positioned. The stably shaped arrangement of O-rings may further improve the reliability of camera module during the product assembly. Thus, third, fourth and fifth O-rings may have the same stabled arrangement as the first and second O-rings (410, 420).

The lens barrel (110) may further include a fixation rim (114) configured to fix a periphery of the front lens (121) by being protruded from a periphery of the first concave unit (111), whereby the fixation of the front lens (121) can be further promoted and penetration of moisture and foreign objects into the lens barrel (110) can be prevented.

The lens unit (120) may include a front lens (121) arranged at a front side of the lens barrel (110) and may further include at least one lens arranged at a hollow hole unit (113) of the lens barrel (110). These lenses of the lens unit (120) may be arranged inside the lens barrel (110) and may be supported by a cap (140) coupled to a rear side of the lens barrel (110). The front lens (121) may be formed with a staircase (121a) between the front side and the rear side to be fixed by being applied with pressure to a lens barrel (110) direction when the lens barrel (110) and the retainer (130) are screw-connected by a bent unit (132) of the retainer (130, described later).

The retainer (130) may serve to fix the front lens (121), and may be coupled at an inner circumferential surface to a periphery of the lens barrel (110), and may include a recess groove (131) configured to accommodate a third O-ring (430) by being formed with a periphery. The recess groove (131) may be formed at an inner circumferential surface with a protrusion unit (131a) to push the third O-ring (430) to outside, the structural shape of which can securely tighten an interval between the front cover (220) and the retainer (130).

Furthermore, the third O-ring (430) may be formed in a same shape as that of the first O-ring (410), but may be also formed with a cross-sectional view of a square or a rectangle, and may be formed at a periphery with at least one protrusion unit (430a). As illustrated in the drawing, when the third O-ring (430) includes two protrusion units (430a), the third O-ring (430) comes to have two contact surfaces with the front cover (220) to thereby further promote the airtight contact. The shape of the third O-ring (430) may also apply to that of the first to fifth O-rings.

As noted from the foregoing, the retainer (130) may include a bent unit (132) coupled to the staircase (121a) by being bent to an optical axis direction from the front side.

The bent unit (132) may apply a pressure to the staircase (121a) of the front lens (121) to fix the front lens (121) when the lens barrel (110) and the retainer (130) are coupled, and the pressure in turn presses the first O-ring (410) arranged at the first concave unit (111) to air-tighten an interval between the lens barrel (110) and the front lens (121).

The adhesive agent in the description of the exemplary embodiment may be realized by thermosetting epoxy or UV epoxy, and cured by heat or UV. However, when the thermosetting epoxy is used, it is a curing method of direct heat application by being moved inside an oven, and when the UV epoxy is used, it is a curing method of applying an UV to the adhesive agent.

Furthermore, the adhesive agent may be an epoxy mixed with a heat curing and a UV curing method, may use a heat curing and a UV curing method, and may be an epoxy selectively used with one of the heat curing and the UV curing method. The adhesive agent is not limited to the epoxy and any material replaceable of the epoxy may be used.

Figure 11:
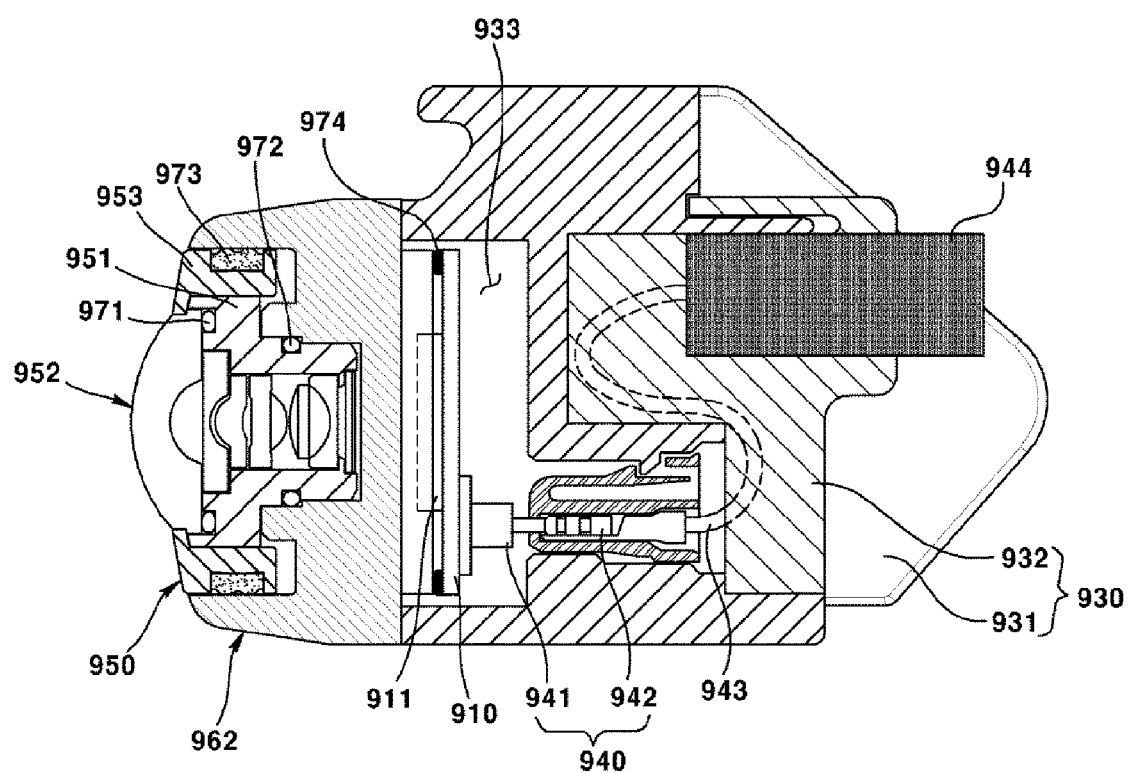
FIG. 11 is a cross-sectional view illustrating a camera module according to a third exemplary embodiment of the present disclosure.

Referring to FIG. 11, it can be noted that the camera module according to a third exemplary embodiment of the present disclosure is a combination of the first and second exemplary embodiments of the present disclosure. Thus, the camera module according to the third exemplary embodiment of the present disclosure may be applied by inferring the description of the first and second exemplary embodiments of the present disclosure.

The camera module according to the third exemplary embodiment of the present disclosure may include a lens unit (952), a lens barrel (951) coupled to one side of the lens unit (952), and a lens unit (950) including a retainer (953) configured to accommodate thereinside the lens unit (952) and the lens barrel (951). In addition, the camera module according to the third exemplary embodiment of the present disclosure may further include a lens holder (962) configured to accommodate the lens unit (950) thereinside by being coupled to a base (930).

As a waterproof configuration, the camera module according to the third exemplary embodiment of the present disclosure may include a first O-ring (971), a second O-ring (972), a third O-ring (973) and a gasket (974).

The first O-ring (971) may be positioned between the lens unit (952) and the lens barrel (951). The second O-ring (972) may be positioned at a periphery of the lens barrel (951). The third O-ring (973) may be positioned at a periphery of the retainer (953). The gasket (974) may be positioned between the base (930) and the lens holder (962). The gasket (974) may be positioned at a sealing groove provided at the base (930) in a concaved manner.

Furthermore, the first O-ring (971), the second O-ring (972), the third O-ring (973) and the gasket (974) may be applied by inferring the description on the first O-ring (410), the second O-ring (420), the third O-ring (430) and the gasket (440) in the second exemplary embodiment of the present disclosure. The gasket (974) may be applied by inferring the description of the sealing member (50) in the first exemplary embodiment of the present disclosure.

Meanwhile, the camera module according to the third exemplary embodiment of the present disclosure may include a PCB (910) mounted with an image sensor (911). The PCB (910) may be coupled to the lens holder (952) using an adhesive member (912). The coupling of the PCB (910) may be applied by inferring the description on the coupling of the lens holder (20) and the PCB (10) according to the first exemplary embodiment of the present disclosure.

The PCB (910) coupled to the lens holder (962) may be positioned at a concave groove unit (933) of the base (930). The concave groove unit (933) may be positioned with at least a part of a conductive unit (940) configured to electrically conduct with a cable (944) connected to outside by being coupled to the PCB (910). The conductive unit (940) may include a first terminal (941) coupled to one side of the PCB (910) and a second terminal (942) configured to electrically conduct the first terminal (941) to the cable (944), for example. The second terminal (942) and the cable (944) may be coupled by a wire (943).

Furthermore, the base (930) may include a first molding unit (931) configured to form an external look and a second molding unit (932) configured to be fixed by a method embedded (interpolated) to the first molding unit (931). The second molding unit (932) may be coupled to the cable (944) and the wire (943) configured to connect the cable (944) and the second terminal (942) may be embedded, and at this time, the wire (943) may be vertically overlapped more than twice with the second terminal (942) (See FIG. 11 for further details), the structural configuration of which contributes to enablement of miniaturization of the camera module according to the third exemplary embodiment of the present disclosure using alternate position of a coupling space of the cable (944) and an arrangement space of the second terminal (942).

Meanwhile, the waterproofing performance can be enhanced by the base (930) that is formed by coupling of two injection-molded products of first molding unit (931) and the second molding unit (932). Particularly, at least a part of the first molding unit (931) and the second molding unit (932) may be formed in a corresponding shape, and the second molding unit (932) is coupled by being embedded into the first molding unit (931) to thereby contribute to excellent achievement of waterproof.

The present disclosure discloses a camera module configured to minimize the penetration of foreign objects or moisture into the camera module. The present disclosure provides a camera module configured to enable miniaturization of the camera module and to provide an operational convenience and accurate alignment of optical axis.

In a first exemplary embodiment of the present disclosure, there is provided a camera module, the camera module comprising: a PCB (Printed Circuit Board) mounted with an image sensor; a lens holder mounted with at least one lens by being coupled to the PCB using an adhesive member; a base coupled to the lens holder and integrally formed by being molded with a cable; and a conductive unit mounted at one end to a PCB side and the other end to the base to allow attachment and detachment by complementary coupling.

The adhesive member may include an epoxy curable by heat and UV (Ultraviolet), where the adhesive member is cured after completion of alignment of optical axis between the lens holder and the image sensor. The base may include a first molding unit coupled to the lens holder, and a second molding unit connected at one end to a cable and connected at the other end to the conductive unit.

The conductive unit may include a first terminal mounted on the PCB, and a second terminal fixed to the second molding unit of the base, wherein the first and second terminals are configured to be mutually coupleable. The first terminal may be a pin header, and the second terminal may be a terminal block. The conductive unit may be arranged at an inner space of the base.

The camera module may further comprise a sealing member at a coupling surface between the lend holder and the base. The sealing member may take a cross-sectional shape of any one of a round shape, a square shape, a polygonal shape and a protrusive shape protruded from at least two surfaces of a polygonal shape. The lens holder and the base may be screw-connected. The base may include a recess groove unit configured to accommodate the PCB thereinside.

In a second exemplary embodiment of the present disclosure, there is provided a camera module, the camera module comprising: a lens barrel including a first concave unit formed at a front surface with a hollow hole part to accommodate a first O-ring, and a second concave unit formed at a periphery to accommodate a second O-ring; a lens unit including a front lens arranged at a front surface of a lens barrel and including at least one lens arranged at the hollow hole part of the lens barrel; and a retainer including a recess groove configured to accommodate a third O-ring configured to fix the front lens by being formed at a periphery to be coupled at an inner surface to the periphery of the lens barrel.

The camera module may further comprise a fixing rim configured to be protruded from an external surface of the first concave unit to fix the periphery of the front lens. The front lens may include a terminal unit interposed between a front surface and a periphery, and the retainer may include a bent unit bent to an optical axis direction from the front surface to be coupled to the terminal unit. The camera module may further comprise a protrusion unit at an inner surface of the recess groove.

The first O-ring or the second O-ring may be formed with at least two accommodation protrusions formed at a periphery each at an equidistance. The third O-ring may take a shape of a rectangle or a square, and may be formed at an external surface with at least one protrusion unit. A periphery of the lens barrel and an inner surface of the retainer may be formed with a mutually corresponding screw thread to allow the lens barrel and the retainer to be screw-connected.

The camera module may further comprise: a front cover coupled to the lens barrel and formed with an opening to expose the front lens; and a substrate arranged at a bottom side of the front cover to mount an image sensor.

The camera module may further comprise: a rear cover coupled to the front cover and formed at one side with a through hole; a cable unit coupled to the through hole of the rear cover to be electrically connected to the substrate; and a fourth O-ring arranged between the front cover and the rear cover.

In a third exemplary embodiment of the present disclosure, there is provided a camera module, the camera module comprising: a lens holder; a base coupled to the lens holder and integrally formed with a cable by being molded with the cable; and a sealing member positioned at a coupled surface between the lens holder and the base.

The lens holder includes a lens barrel including a first concave unit formed at a front surface with a hollow hole part to accommodate a first O-ring, and a second concave unit formed at a periphery to accommodate a second O-ring, a lens unit including a front lens arranged at a front surface of a lens barrel and including at least one lens arranged at the hollow hole part of the lens barrel, and a retainer including a recess groove configured to accommodate a third O-ring configured to fix the front lens by being formed at a periphery to be coupled at an inner surface to the periphery of the lens barrel.

The camera module according to an exemplary embodiment of the present disclosure has an advantageous effect in that generation of alignment deviation in optical axis can be minimized by a six-axis alignment of optical axis between a holder member and an image sensor using an adhesive member curable by heat or UV.

Another advantageous effect is that water-proofing, damp-proofing and anticorrosive functions can be realized free from a sealing member such as an O-ring by an integrated molding configuration of a base coupled to a holder member to apply an electric power and a control signal to an image sensor.

The present disclosure can be advantageously embodied to realize a vehicular camera improved in environmental reliability, durability and stability by improving an airtight structure between a front cover exposed to an outside and a lens unit arranged on the front cover.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

It will be understood that, although the terms first, second, A, B, (a), (b), etc. may be used herein to describe various elements, these elements should not be limited by these terms in terms of substances, sequences or orders. These terms are only used to distinguish one element from another. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A camera module, the camera module comprising:
 a PCB (Printed Circuit Board) mounted with an image sensor;

a lens holder mounted with at least one lens by being coupled to the PCB using an adhesive member;

a base coupled to the lens holder and integrally formed by being molded with a cable; and a conductive unit mounted at one end to a PCB side and at another end to the base to allow attachment and detachment by complementary coupling, wherein the base includes a first molding unit coupled to the lens holder and a second molding unit connected at one end to a cable and connected at another end to the conductive unit.

2. The camera module of claim 1, wherein the adhesive member includes an epoxy curable by heat and UV (Ultraviolet), where the adhesive member is cured after completion of alignment of optical axis between the lens holder and the image sensor.

3. The camera module of claim 1, wherein the conductive unit includes a first terminal mounted on the PCB, and a second terminal fixed to the second molding unit of the base, wherein the first and second terminals are configured to be mutually coupleable.

4. The camera module of claim 3, wherein the first terminal is a pin header, and the second terminal is a terminal block.

5. The camera module of claim 1, wherein the conductive unit is arranged at an inner space of the base.

6. The camera module of claim 1, further comprising a sealing member at a coupling surface between the lens holder and the base.

7. The camera module of claim 6, wherein the sealing member takes a cross-sectional shape of any one of a round shape, a square shape, a polygonal shape, or a protrusive shape protruded from at least two surfaces of a polygonal shape.

8. The camera module of claim 1, wherein the lens holder and the base are screw-connected.

9. The camera module of claim 1, wherein the base includes a recess groove unit configured to accommodate the PCB thereinside.

10. A camera module, the camera module comprising:

a PCB (Printed Circuit Board) mounted with an image sensor;

a lens holder mounted with at least one lens by being coupled to the PCB using an adhesive member;

a base coupled to the lens holder and integrally formed by being molded with a cable;

a conductive unit mounted at one end to a PCB side and another end to the base to allow attachment and detachment by complementary coupling; and a sealing member at a coupling surface between the lens holder and the base, wherein the sealing member takes a cross-sectional shape of any one of a round shape, a square shape, a polygonal shape, or a protrusive shape protruded from at least two surfaces of a polygonal shape.

11. The camera module of claim 10, wherein the adhesive member includes an epoxy curable by heat and UV (Ultraviolet), where the adhesive member is cured after completion of alignment of optical axis between the lens holder and the image sensor.

12. The camera module of claim 10, wherein the base includes a first molding unit coupled to the lens holder, and a second molding unit connected at one end to a cable and connected at another end to the conductive unit, and wherein the conductive unit includes a first terminal mounted on the PCB, and a second terminal fixed to the second molding unit of the base, wherein the first and second terminals are configured to be mutually coupleable.

13. The camera module of claim 12, wherein the first terminal is a pin header, and the second terminal is a terminal block.

14. The camera module of claim 10, wherein the conductive unit is arranged at an inner space of the base.

15. The camera module of claim 10, wherein the lens holder and the base are screw-connected.

16. The camera module of claim 10, wherein the base includes a recess groove unit configured to accommodate the PCB thereinside.

* * * * *